Nov. 17, 1964  G. REBISCOUL  3,157,598
SELF-CLEARING FILTERS

Filed Aug. 6, 1962  3 Sheets-Sheet 1

Inventor
Gerard Rebiscoul by Michael S. Striker

Inventor
Gerard Rebiscoul
by
Michael S. Striker
Atty

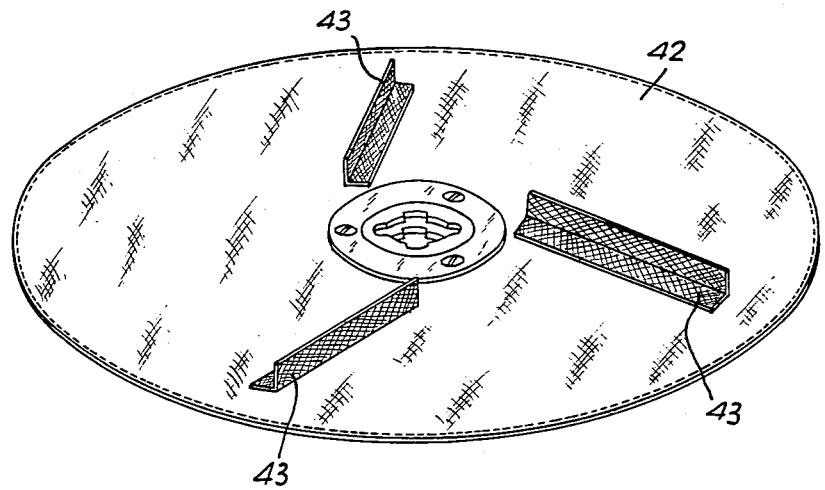
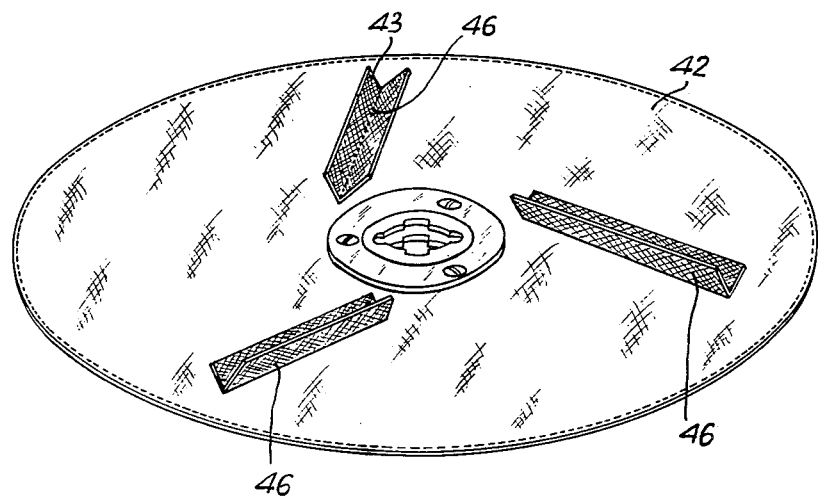

United States Patent Office 3,157,598
Patented Nov. 17, 1964

3,157,598
SELF-CLEARING FILTERS
Gérard Rebisconi, 20 Rue Charles Chefson,
Bois-Colombes, France
Filed Aug. 6, 1962, Ser. No. 214,583
5 Claims. (Cl. 210—327)

This invention relates to a filtering device intended to filter various liquids having a small proportion of particles in suspension, and more particularly liquids intended for cleaning clothing by the process generally known as "dry cleaning."

It is known to make filtering devices constituted by an assembly of circular filtering elements disposed on a central horizontal axis, these discs being cleared of retained matter by turning the central axis on which they are disposed when the filtering operation is completed.

The filtering elements of known filters are generally constituted by the combination of a rigid metal support and a filtering wall constituted by a textile or wire cloth. The supports are constituted either by rigid frames or by perforated metal discs, over which the cloths are applied and stretched.

These two types of support (frames or perforated discs) have disadvantages of the same kind. Both are heavy, which is a serious inconvenience in the case of filters in which the filtering elements have to be rotated either continuously or at certain times during their operation, because the inertia forces and the power required are high.

Moreover, both in the case of frames where the disadvantage is obvious and in the case of discs having large perforations, these supports have another very serious disadvantage, namely that they support the filter cloth unsatisfactorily. Under the action of filtering pressure, which is generally applied to the outer faces of the filtering elements the cloth tends to be deformed and to assume a concave shape at the frame opening or at each perforation of the support disc, so that if the pressure is excessive the cloth may tear at the edge of the opening of the frame or of the perforation in the disc.

With these filtering elements it is therefore necessary either to reduce the pressure of the liquid to be filtered, thus reducing the flow of the filter to a corresponding extent, or to use thick and strong filtering walls, which have the dual disadvantage of clogging very quickly on retaining the impurities in the liquid to be filtered and of being extremely difficult to clear of these impurities.

In order to obviate these disadvantages, it has been proposed to make the discs of a non-rigid material, thus enabling them on the one hand to withstand fairly considerable pressures during the filtering operations and on the other hand to undergo relative displacements in the form of slight vibrations during the rotation of the filter for the purpose of clearing it, so that the clogging products will be rapidly detached.

Nevertheless, these devices are rather unsatisfactory in operation, because the aggregate formed by the clogging products has itself a certain flexibility and the slight vibrations to which the filtering elements are subjected are not sufficient to detach it, particularly in the region of the central axis.

The device forming the subject of the present invention has the object of obviating this disadvantage.

The filtering apparatus according to the present invention is constituted by a fluid-tight enclosure inside which there is disposed a series of filtering elements, preferably circular, disposed on a common hollow central axis, these filtering elements being themselves constituted by two filtering walls supported by a semi-rigid internal frame allowing the liquid to pass freely, while the frame itself is connected to a central ring threaded on the central axis, one of the two filtering walls having a plurality of deflector devices disposed obliquely in relation to the radii of the filtering elements, so that when the assembly of filtering elements is rotated during the clearing operation, the deflector devices effect on the one hand a diversion of the current of liquid in the direction of the central portion of the filtering elements, and on the other hand a curvature of the said filtering elements in a zone comprised between the end of the deflectors and the central axis, under the action of the orthogonal component of the force applied to the deflectors.

In order to facilitate the understanding of the following description, the invention is illustrated by way of example in the accompanying drawings, in which.

Figure 2:
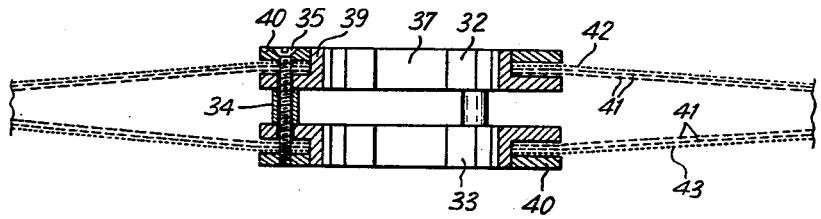
FIGURE 2 is a partial profile view in section of a filtering element.
Figure 3:
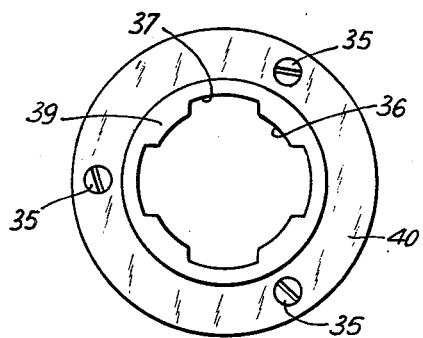
Figure 4:
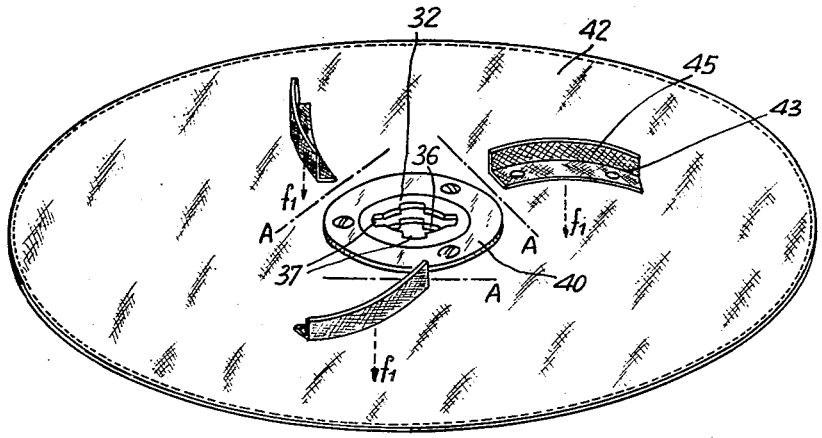

FIGURE 3 a plan view corresponding to FIGURE 2,

FIGURE 4 a view in perspective of a filtering element having curved deflectors,

FIGURE 5 a view in perspective of a filtering element having straight deflectors, and FIGURE 6 a view in perspective of an alternative construction of the deflectors.

Figure 1:
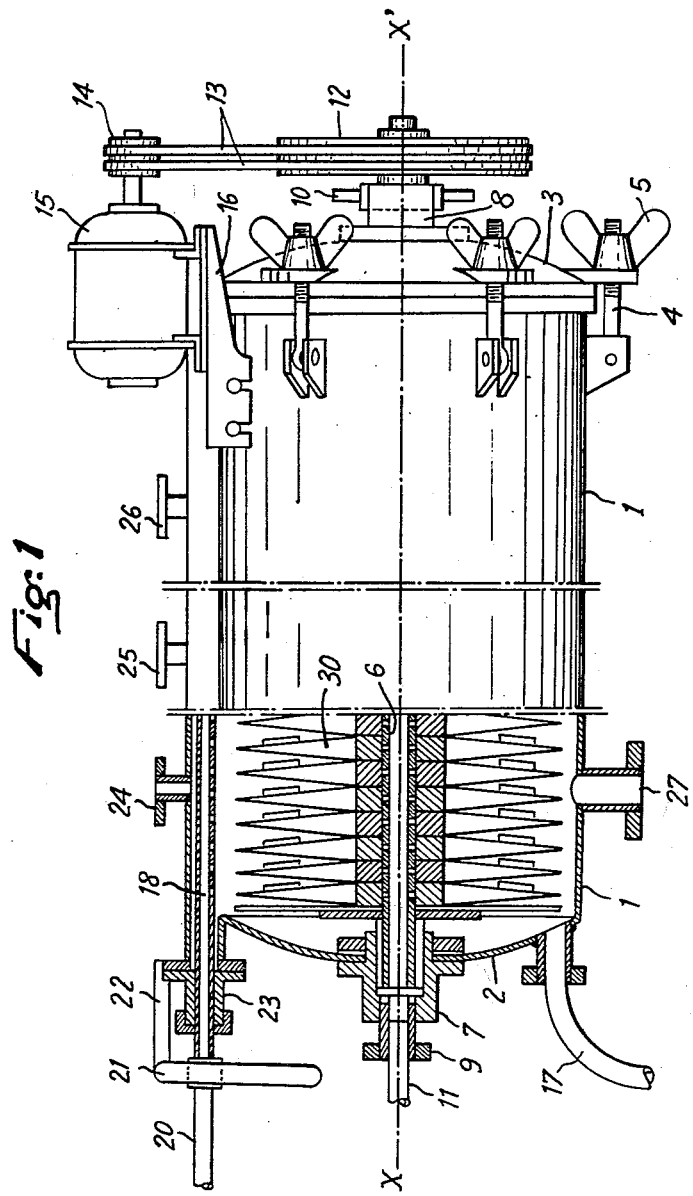
FIGURE 1 shows a profile view partly in section of a filtering apparatus.

Referring to FIGURE 1, it is seen that the apparatus is constituted by a fluid-tight enclosure, namely the cylindrical tank 1, provided at one of its ends with a curved side wall 2 and at the other end with a likewise curved, removable cover 3, which is connected to the body of the cylindrical tank 1 by suitable fixing means, such as screw-threaded rods 4 and wing-nuts 5.

A sealing joint is preferably provided between the cylindrical tank 1 and its cover 3. The hermetic container thus constituted is carried by any suitable support.

A hollow shaft 6 having apertures 6a over its entire length passes right through the tank along its longitudinal axis XX', and also through the wall 2 and the cover 3, and is supported at its two ends by bearings 7 and 8 having stuffing-boxes 9 and 10.

The hollow shaft 6 is blind and is connected at its open end to a pipe 11, while its closed end carries a driving pulley 12.

This driving pulley 12 is connected by a belt 13 to a drive pulley 14 driven by a motor 15.

In the example illustrated, the motor 15 is carried by a frame 16 fixed to the actual body of the cylindrical tank 1, but it can be placed in any other suitable position.

Under the action of the motor 15, the hollow shaft 6 can thus turn about itself in the tank 1, bearing on its bearings 7 and 8, the tightness of the arrangement being ensured by the stuffing-boxes 9 and 10.

The filtering elements 30 are strung on this hollow shaft 6, the interior of each element 30 communicating with the interior of the hollow shaft through apertures provided in the rings 31 supporting the filtering elements 30 and through the wall of the hollow shaft 6.

The cylindrical tank 1 has an inlet aperture 17 for the liquid to be filtered, the filtered liquid being discharged through the pipe 11 connected to the end of the hollow shaft 6.

In addition, a tube 18 is placed inside the tank 1 along the generatrix of the apex of the said tank, and is pierced with a plurality of holes 19. This tube 18, connected to a pressurised water inlet pipe 20, is adapted to slide inside and along the top wall of the tank through the medium of a system of levers such as 21, 22, a seal 23 being disposed to ensure the tightness of the tank 1.

The tank 1 likewise has a safety valve 24, a pressure gauge 25, a vent cock 26, and an emptying cock 27.

Referring to FIGURE 2, it is seen that each of the filtering elements 30 is constituted by a central ring 31 serving as support for the filtering walls.

Each central ring is constituted by two symmetrical plates 32 and 33 held spaced apart by ties 34, inside which pass the fixing screws 34, the internal bore 36 of the plates 32 and 33 being equal to the outside diameter of the hollow axis 6. Grooves 37 are formed in the inside walls of the plates 32 and 33.

These two plates have a circular support surface 38 bounded by a collar 39.

Between the support surfaces 38 and washers 40 are gripped a series of cloths, comprising one or more support cloths 41 and the filtering cloths 42 and 43.

The support cloths 41, which are preferably of synthetic material, are cloths of wide mesh constituted by relatively thick threads, so as to constitute a semi-rigid frame over which the filtering cloths 42 and 43 are placed.

A plurality of support cloths of increasing diameter are preferably disposed, so that the rigidity of the assembly will be greater towards the centre of the circular filtering element thus formed. In addition, the symmetrical cloths are stuck or sewn to one another along their peripheries.

The two filtering cloths 42 and 43 are of very fine-meshed cloth, preferably of synthetic material, the dimensions of the meshes naturally depending on the dimensions of the impurities or other substances to be filtered.

Referring to FIGURE 4, it is seen that on the filtering wall 42 a plurality of deflectors 43 are disposed.

Each of these deflectors 43 is constituted by an L-section angle having a fixing surface 44 and an operative surface 45. The deflectors 43 are bent so as to constitute concentric spiral elements, referred to the centre of the disc.

FIGURE 5 shows a modified construction in which the deflectors 43 are not centred, but disposed along axes substantially tangential to the fixing ring 31 of the filtering elements.

These angles 43 are of any suitable material, for example of light metal, and may in particular be of synthetic material.

It is in particular possible to make the deflectors 43 with the aid of bands of thick plaited fabric of nylon or other similar material. In this case, it is particularly advantageous and economical to fix these bands by sewing them in the middle to the cloth. In this case it is necessary for the bands 46 to be so bent that their two sides 46a and 46b form together an angle of about 90°.

The device thus described operates in the following manner:

During filtering, the shaft 6 and the filtering elements 30 remain stationary; the liquid to be filtered penetrates through the inlet aperture 17, fills the tank 1, passes through the filtering walls 42 and 43, then enters the plates 32 and 33 and penetrates into the hollow shaft 6 through the apertures 6a, either direct when these apertures are facing the space between the plates 32 and 33, or through the medium of the grooves 37; the liquid thus filtered then passes out through the pipe 11.

As the apparatus is used, the filtering elements 30 become clogged and circulation through the walls 42 and 43 becomes increasingly difficult, which has the effect of increasing pressure in the interior. When the pressure indicated by the pressure gauge 25 exceeds the predetermined maximum limit, the liquid is allowed to flow off through the emptying aperture 27, after opening the vent cock, until the level of liquid is approximately level with the shaft 6.

The motor 15 is then operated, turning the hollow shaft 6. The filtering elements 30 have half their surface submerged in the liquid.

Because of the relative movement of the filtering walls 42 in relation to the liquid, the deflectors 43 create currents along the walls and, the direction of the rotation of the shaft 6 having been selected accordingly, these currents are directed towards the centre of the filtering elements 30, that is to say towards the portion of these elements where the relative speed between the walls 42 and 43 and the liquid is the lowest.

In addition, the flow of the fluid along and above the flange 45 of the deflector 43 produces a force having a component $f_1$ perpendicular to the surface of the filtering wall 42, and this component has the result of bending the filtering element 30 approximately along the lines A shown in broken lines, these bending zones of the filtering element being situated between the ring 31 and the end of the deflector 43.

As it occurs in the submerged portion which is subjected to a current of fluid, this bending instantaneously effects the clearing of the filtering elements, whereas this operation is generally long and incomplete.

The tube 18 is simultaneously placed under pressure and receives water coming from the pipe 20. This water spurts through the holes 19 and strikes against the walls 42 and 43 in the portion of the latter situated outside the liquid.

In order to improve the rinsing of the walls 42 and 43, the tube 18 is given a movement of translation through the levers 21 and 22.

It is obvious that the device constituted by the levers 21 and 22 can be replaced by any other device, for example by a system of cams connected to the movement of the pulley 14.

The sludge is then discharged through the emptying aperture 27.

I claim:

1. A filtering apparatus comprising a cylindrical fluid-tight container, a series of filtering elements disposed on a central shaft coaxial with the said cylindrical container, the said central shaft being hollow and adapted to be rotated by any suitable means, the said filtering elements being constituted by two filtering walls, a semi-rigid internal frame supporting said filtering walls of each filter element, a central ring strung on the said hollow central shaft and connected to said frame, the said central ring communicating with apertures provided along the entire length of the said central shaft, one of the two filtering walls having a plurality of deflector devices disposed angularly spaced from each other obliquely in relation to the radii of the filtering elements and projecting from the outer surface thereof, so that when the hollow central shaft is rotated, thus driving all the filtering elements, for the clearing operation, the deflector devices effect in the portion of the filtering elements which turns in the liquid on the one hand a deflection of the liquid in the direction of the central portion of the filtering elements and on the other hand a bending of the said filtering elements in a zone comprised between the bottom end of the deflectors and the central ring of the said filtering elements.

2. A device as claimed in claim 1, having at the apices of the filter elements a distributor throwing water on to the walls of the filtering elements.

3. A device as claimed in claim 1, in which the deflectors are curved.

4. A device as claimed in claim 1, in which the deflectors are rectilinear.

5. A device as claimed in claim 1, in which the deflectors are constituted by bands of thick fabric sewn obliquely at the middle so that the two edges of the bands form between them an angle as close as possible to 90°.

References Cited in the file of this patent

UNITED STATES PATENTS

| | | |
|---|---|---|
| 665,263 | Petitqueux | Jan. 1, 1901 |
| 2,593,707 | Walker | Apr. 22, 1952 |
| 2,682,954 | Burman | July 6, 1954 |
| 2,863,561 | Just et al. | Dec. 9, 1958 |
| 2,868,379 | Hunziker | Jan. 13, 1959 |
| 2,876,905 | Daman | Mar. 10, 1959 |

FOREIGN PATENTS

| | | |
|---|---|---|
| 1,164,417 | France | May 12, 1958 |